A. R. BULLOCK.
PICTURE PROJECTING AND PHOTOGRAPHING DEVICE.
APPLICATION FILED MAY 14, 1913.

1,273,327.

Patented July 23, 1918.
3 SHEETS—SHEET 1.

A. R. BULLOCK.
PICTURE PROJECTING AND PHOTOGRAPHING DEVICE.
APPLICATION FILED MAY 14, 1913.

1,273,327.

Patented July 23, 1918.
3 SHEETS—SHEET 2.

Witnesses,
E. B. Gilchrist
A. J. Hudson

Inventor.
Arthur R. Bullock
by Thurston & Kwis
Atty.

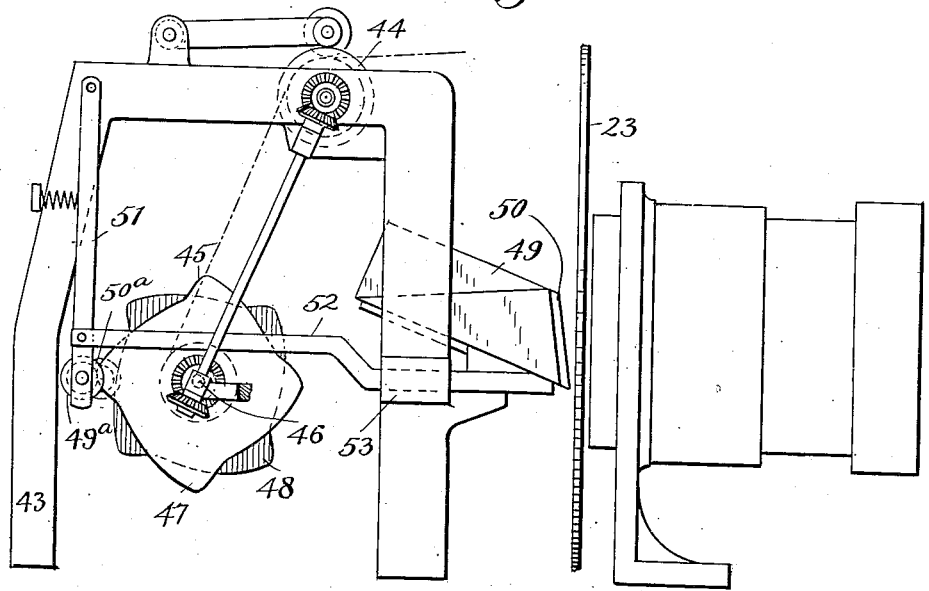
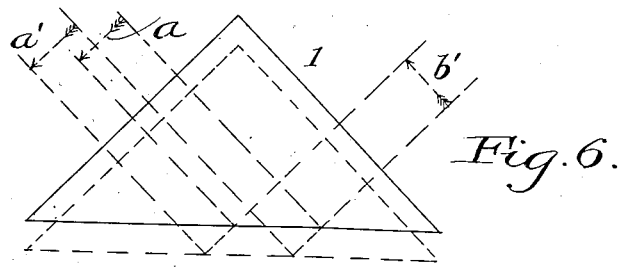
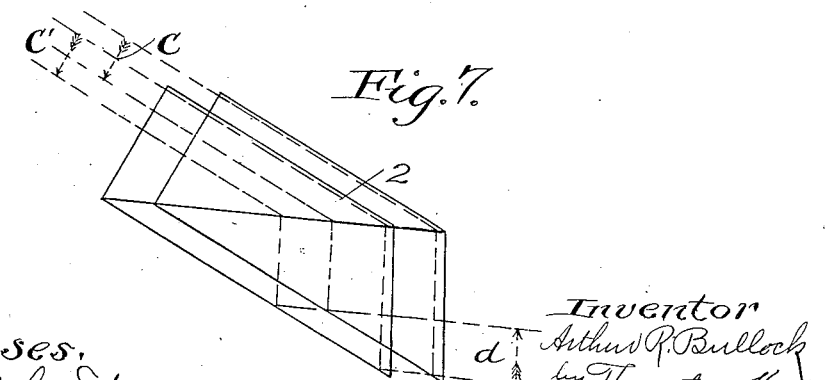

UNITED STATES PATENT OFFICE.

ARTHUR R. BULLOCK, OF CLEVELAND, OHIO.

PICTURE-PROJECTING AND PHOTOGRAPHING DEVICE.

1,273,327.   Specification of Letters Patent.   Patented July 23, 1918.

Application filed May 14, 1913. Serial No. 767,495.

*To all whom it may concern:*

Be it known that I, ARTHUR R. BULLOCK, a citizen of the United States, residing at Cleveland, in the county of Cuyahoga and State of Ohio, have invented a certain new and useful Improvement in Picture-Projecting and Photographing Devices, of which the following is a full, clear, and exact description.

This invention relates to a device for the projection or the taking of photographs used for moving picture purposes.

The object is to produce a machine for the purpose stated, in which the film may be run continuously at substantially constant speed, and in this connection to provide means which being moved as the film moves, will maintain a constant optical relation between the film and the projecting lens or the photographic lens as the case may be.

Generally speaking, the invention comprises the elements and combinations thereof set forth in the accompanying claims.

Figure 1:
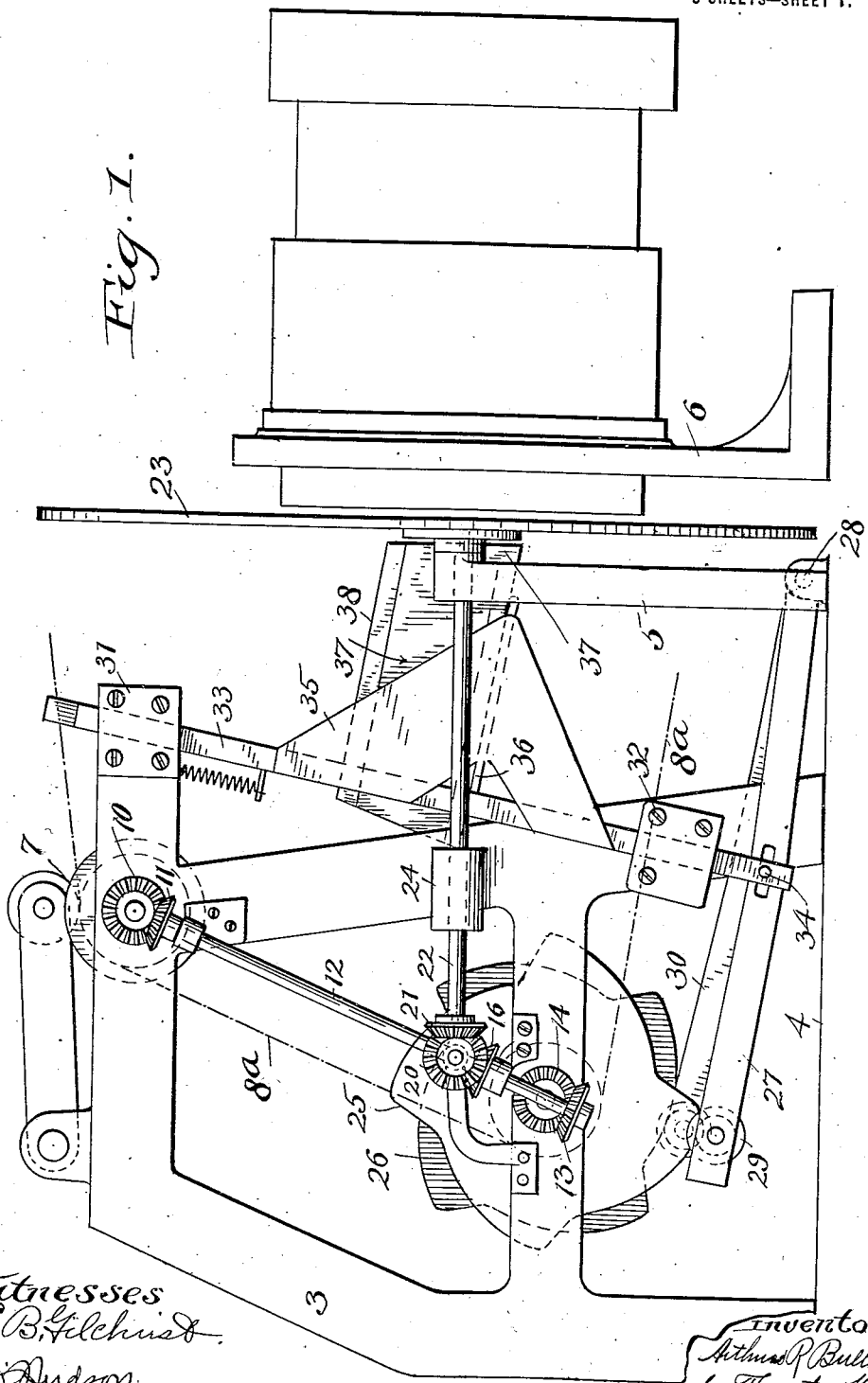
Figure 2:
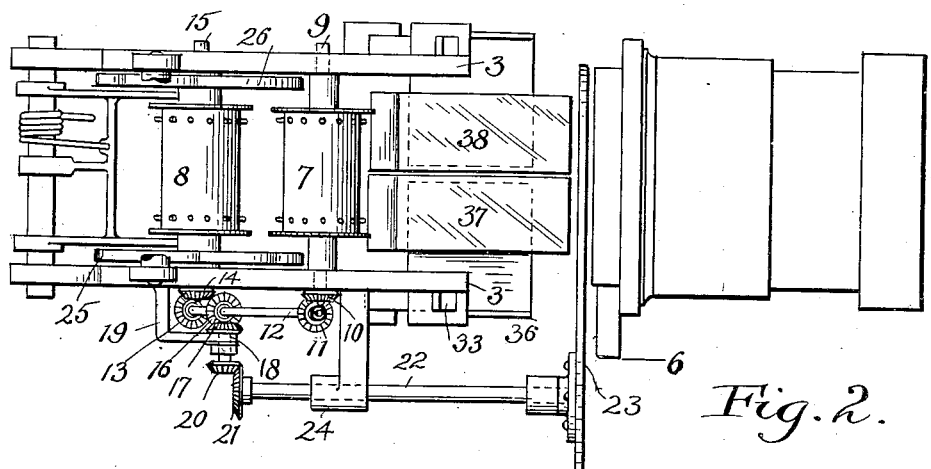
Figure 3:
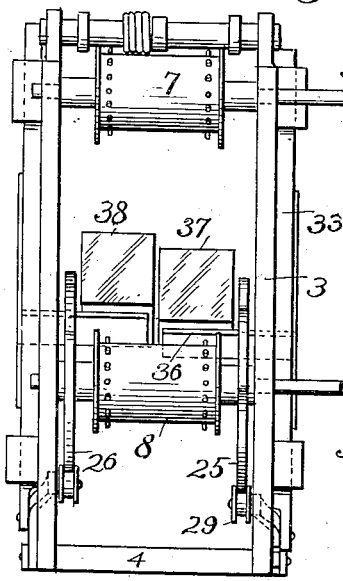
Figure 4:
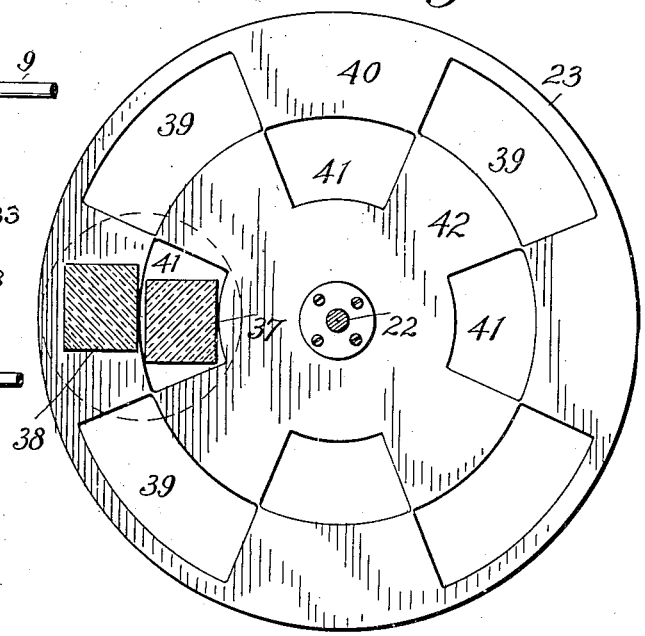

Reference should be had to the accompanying drawings, in which Figure 1 is a side elevation of a moving picture projecting machine embodying one form of my invention; Fig. 2 is a top plan view of the machine; Fig. 3 is a rear end elevation of the machine; Fig. 4 is an elevation of the shutter showing the prisms in their relationship therewith; Fig. 5 is a side elevation of a moving picture projecting machine embodying another form of my invention; Fig. 6 is a diagrammatic view illustrating the movement of a reflecting prism; and Fig. 7 is a diagrammatic view representing the movement of a reflecting prism.

For purposes of disclosure, I will explain my invention as applied to a machine for the projection of pictures from a continuously moving film, upon which are positive pictures arranged in sequence as usual. However, I do not by this disclosure mean to limit myself to this use alone, for it will be obvious that the principle is equally applicable to the taking of pictures. That is to say, the projecting lens would be replaced by a photographic lens, while the film bearing pictures would be a film in its sensitized condition, and run by a mechanism so as to continuously present fresh surfaces to the action of the photographic lens.

The film which I use, be it the picture film for projecting purposes or a sensitized film for photographic purposes may be the usual one at present known in the art.

One great difficulty which has been apparent in the operation of moving picture machines has been the fact that in theory and principle, they required the picture to be stationary with respect to the projecting lens, while the shutter is open. In order to accomplish this result, the film has been moved forward by a series of jerks, each intermittent motion of the film serving to place in proper position a succeeding picture to be projected by the projecting lens. This mode of operation has many serious objections, one of which is that the film becomes easily damaged, due to the continual jerking. The sprocket holes on the side of the film also become worn in usage due to this jerking, and make it difficult to run the film and to properly place each picture of a film in the desired relation to the projecting lens.

A further objection lies in the fact that the light is permitted to pass through any given aperture in a shutter a comparatively short time, the shutter being depended upon to reduce the flickering which would be unbearably apparent if the intervals in which the light emanation was on, were not short.

In the invention herein disclosed, the film bearing the pictures may be moved at substantially a constant rate of speed, and by the use of a prism or prisms, which are moved with a motion of translation at such relative speed to the movement of the film, and in such direction that the rays of light passing from the film to the prism and through the prism to the projecting lens will cause the lens to project a stationary image, which is always in focus. That is to say, the axis of the projecting light beams from the picture is coincident with the optical axis of the projecting lens, and so preserve a constant optical relation between the film and the lens.

In Figs. 6 and 7, I have shown two forms of reflecting prisms which are given vertical and horizontal movement, respectively, and which will serve to show the principle upon which prisms generally may be utilized in the machine of my invention.

Fig. 6 represents at 1, a reflecting prism. In such a prism as this, beams of light emanating from the arrow *a* would pass through the prism 1, along the projecting lines in this figure, and would emerge from the prism after reflection, so that the eye of the observer if placed at $b$, would observe the arrow as there shown. If now, we assume that the arrow $a$ is moving uniformly and continuously so that after a given interval of time, the arrow $a$ has moved forward in the direction of its head to the position indicated at $a^1$ in Fig. 6, and if during this period, the reflecting prism 1 has moved to the position shown in dotted lines in Fig. 6, it will be seen that the light beams emanating from the arrow $a^1$, and being reflected through the prism 1 in its dotted line position, will maintain the image of the arrow $b$ unmoved, so far as the vision of the observer at $b$ is concerned. From this it will be seen that the arrow $a$ has moved in the lineal direction of its head a given distance in a given interval of time, while the prism 1 has been moved and translated in a certain direction a given distance in a given time, the net result being to produce no change in the image which will be shown at $b$.

If, now, we were to assume that the arrow $a$ is a picture on a film of a moving picture machine, and that the picture $a$ is moved to the position $a^1$ in a given length of time, and a reflecting prism is simultaneously moved in the manner just indicated, the picture which would be produced at $b$, would be absolutely unchanged in position despite the movement of the film having the picture thereon. It will be obvious that the picture produced at $b$ might be projected through the lens of a projecting lantern onto a screen, and by so doing, we would complete the construction which is broadly embodied in the moving picture projecting machines.

Obviously the prism 1 may be translated a distance such that it will comprehend the movement of the picture represented by the arrow at $a$, through such portion of its travel as it would usually be projected by the projecting lens, and if then returned to initial position would be in position to project a new picture in the case of a continually moving film.

In Fig. 7, there is shown a different form of reflecting prism, composed of two prisms cemented together and so constructed that light entering the prism normal to the receiving surface will issue from the prism deflected 45° from the direction at which it entered the prism. We may assume for the purpose of this explanation, that light beams emanating from the arrow at $c$, will be transmitted through the prism 2, and emanating from the prism will produce to the eye of an observer at $d$, the arrow there shown.

If, now, the arrow $c$ be moved to occupy the position $c^1$, and simultaneously, the prism 2 be moved and translated to the position shown in dotted lines in Fig. 7, it will be found that the light beams emanating from the arrow $c^1$ through the prism shown in dotted lines, will produce an image at $d$, the same as was produced with the arrow and the prism in their former position.

The principle involved so far as the projection of the arrows is concerned, is the same in Fig. 7 as in Fig. 6, the difference merely being that the character of prism is different, and further the direction and distance of movement is different.

Generally the underlying principle may be stated as follows: The film is moved at uniform rate of speed and the prism is also moved and translated in direction and angle relative to the film such that a definite and constant optical relation, including focus, is maintained between the lens and the picture upon the film, or otherwise expressed, the optical axis of the picture on the film coincides with the optical axis of the prism as the film and lens are moved, and further the focus is not altered.

It is believed from a study of these two figures, that the principle upon which the machine herein disclosed operates, will become apparent.

The machine of my invention may utilize a reflecting prism or a refracting prism, and in Figs. 1, 2 and 3, there is shown one embodiment of a machine embodying a mechanism for moving a reflecting prism in proper relationship to the movement of the film. This machine embodies side standards which are generally represented at 3, which may be of any desired design, the function being simply to support the parts of the mechanism for moving the film and prism.

At the forward end of the base 4, upon which the side frame is mounted, there is an upright 5 which forms a support for the bearing in which the shutter shaft is mounted, and ahead of this is a support 6 for the projecting lens of the machine.

The film is caused to travel in the usual manner, that is to say, guide rollers or spools 7 and 8 are provided, which have the usual sprocket teeth which engage with the usual openings formed at both sides of the film strip, which film strip is indicated at $8^a$. It will be understood that in this type of machine, the film is caused to travel at a substantially uniform rate, and continuously, as distinguished from the intermittent motion which is now used. Any proper mechanism for rotating these spools 7 and 8 may be employed,—as for instance, a crank may be associated with the shaft 9.

Upon the opposite end of the shaft 9 is a bevel gear 10, which meshes with a bevel gear 11 carried by the shaft 12. At the lower end of this shaft is a gear 13 which meshes with a gear 14, carried upon the film spool shaft 15. There is also a gear 16 mounted on the shaft 12, which coöperates with a gear 17 carried on the short shaft 18, this shaft being mounted in a bracket 19 which is carried by the frame 3. There is a gear 20 upon the opposite end of this short shaft 18, which meshes with a gear 21, which gear is carried upon the end of a shaft 22, upon which the shutter 23 is mounted at the forward end thereof. The shaft 22 is supported near one end by a bracket 24, which extends outwardly from the frame 3, and at its forward end is supported by the upright bracket 5, as heretofore described.

Upon the shaft 15, cams 25 and 26 are mounted, the same being upon opposite sides of the film spool which is mounted upon the before mentioned shaft. These cams are mounted so that the projections upon each are displaced 90 degrees with respect to the projections upon the other. This will be seen from an inspection of Fig. 1.

A lever 27 is pivoted at its forward end upon the bracket 28 carried by the base, and at its rear end is provided with a roller 29 which coöperates with the cam 25. There is also a lever 30 which is pivoted to the base in the same transverse line as is the bracket 28, and this lever at its rear end is provided with a roller which coöperates with the cam 26, in the same manner as does the lever 29 coöperate with the cam 25.

The frame 3 is provided with slide bearing plates 31 and 32, through which slides a rod 33. This rod at its lower end is connected with the lever 27 by a pin and slot connection which is indicated at 34. At an appropriate place upon the rod 33 there is mounted a bracket 35 which supports a platform 36 which carries a suitable reflecting prism 37.

In the form of machine here shown, two prisms are used for a purpose which will be later explained. The second prism which is a duplicate of prism 37 is shown at 38, and is mounted upon a table which is supported by a bracket and carried by a rod similar to that explained with respect to the prism 37.

The prisms 37 and 38 are not the same in shape as the prism shown in Fig. 6, but these prisms operate with respect to the light they transmit in the same manner as the prism in Fig. 6. In prisms 37 and 38 the light is received normal to the surface toward the film, and the light emerges from the face adjacent the objective parallel with the axis of the objective.

It will be obvious from the foregoing description that as the shaft 15 is turned, it will cause the film spool supported thereon to turn and move the film. Further, the cams 25 and 26 will move and depress the levers 27 and 30 respectively, as the teeth of these cams engage with the rollers carried by the levers 27 and 30. Owing to the fact that the teeth upon the cams 25 and 26 are displaced with respect to each other, it will be seen that the prisms 37 and 38 will be alternately raised and lowered.

The film is moved at a substantially uniform rate of speed, and the prisms will be moved in the direction and at a rate of speed to maintain the axis of the picture being projected through the prisms, such that the axis of this picture will correspond with the optical axis of the projecting lens and remain in focus. This is accomplished by the peculiar shaping of the cams 25 and 26 and the direction of movement of the prism.

It will be seen that as the roller 29 leaves the crest of a cam tooth, it will descend very rapidly, due to the steep incline upon the reverse side of the tooth. When it has descended to the bottom of this steep incline, it will be understood that the prism which is operated through the instrumentality of the cam 26 will be at its highest position, and as the cam further turns, the prism will be gradually caused to travel in the downward direction in a uniform manner, due to the long and gradual rise of that portion of each tooth which succeeds the steeply inclined portion.

It will be apparent that if a single prism is used, the return movement of the prism to its upward position so as to be ready to start with each succeeding picture would have to be very rapid, and furthermore, the light would have to be shut off entirely, during this period of return movement of the prism.

However, using two prisms as is here suggested, it is possible to use the prism 37, for instance, to travel downwardly, as a given picture is moving on the film, and when this prism 37 has reached substantially its lowest position, and the particular picture on the film with which it has been coöperating is ready to pass from the range of projection, it will be seen that the prism 38 is at the upward end of its movement and in position to coöperate with the succeeding picture upon the film. As the prism 38 moves downwardly, the prism 37 will have returned to its upward position and be in position to project the next succeeding picture on the film. It will thus be seen that with an arrangement such as explained, there will always be a prism ready to project a picture from the film, and therefore the light will never be entirely shut off from the picture projected.

The two prisms 37 and 38 are of a size such that they will be comprehended by the lenses employed in the projecting part of the machine. As will be seen from Fig. 3 the prisms never move without the field of the lens.

The shutter which is employed is shown in Fig. 4, and is so designed that there is never a time when the light is totally cut off. When one prism is returning to its uppermost position, the light is shut off from that prism, but it is simultaneously on in its coöperating prism.

It will also be clear that as an open space in the shutter is leaving one prism, an open space of the shutter is coming before the adjacent prism, so that the departing picture actually merges or dissolves into the succeeding picture, and taking into consideration that succeeding pictures on a film vary but little, the effect is to produce a continuous action free from flickering and from jerky movement.

The shutter as shown in Fig. 4, embodies two annular rows of openings which are interspersed by solid portions. The openings in the outer row are indicated at 39 and each opening is interspersed by a solid portion 40. The inner row of openings are indicated at 41, and, as will be seen, are staggered with respect to the openings 39 in the outer circle of openings. Each of these openings 41 is interspersed with a solid portion 42.

It will thus be seen from the description of the shutter that when the prism 38 is obscured, the prism 37 is before an opening in the shutter so that light may be transmitted through the same.

It will be noted from the form of shutter here shown that there never is a time when the screen is not receiving some projected light. It will allow substantially 50 per cent. of the light to always pass through, and it is found that a screen which is constantly illuminated by substantially 50 per cent. of the light produces better results than a screen upon which the illumination is considerably greater than 50 per cent. at certain periods, and very much less than 50 per cent. at other times.

In Fig. 5 there is shown a construction in which I have employed a reflecting prism having a different motion. As in the machine previously explained, there is a side frame 43 which is provided with film spools 44 and 45. The spool 44 is mounted and driven, as previously explained, as, in fact, are both spools 44 and 45. The shaft 46 which supports the spool 45 is provided with cams 47 and 48, which are rotated as the shaft 46 is turned. These cams coöperate respectively with rollers 49ª and 50ª which are formed on the ends of levers 51 that are pivoted from the upper part of the frame 43 and depend therefrom.

The levers 51 operate slides, one of which is shown at 52, these slides being mounted at their forward portions in slide bearings 53 which bearings are carried by the frame 43.

Each slide supports a reflecting prism such as indicated at 49, and it will be understood that there are two slides 52 and two prisms which are similar to the prisms 49.

It will be apparent from an inspection of Fig. 5, that the prisms 49 and 50 are moved alternately forward and back under the action of the cams 47 and 48.

As explained in connection with Fig. 7, it will be seen that the moving of a reflecting prism in the manner defined, such for instance as the prism 49, which movement bears definite relationship to the movement of the film, will cause the picture on the film to be projected through the prism 49 in such a manner that the axis of the picture corresponds with the optical axis of the lens throughout the distance of travel of a single picture through the field which is comprehended by the projecting lens.

Each prism is moved bodily or translated in a substantially lineal direction toward and from the film, the rate of movement being uniform when the prism is coöperatively moving with the film. But the rate is increased when the prism is returning to its initial position so as to give it a quick return.

The face of the prism which is adjacent the film lies in a plane substantially parallel with the plane of the film and this relation obtains throughout the movement of both film and prism. Furthermore, the path of movement of the face under discussion, of the prism, is in a direction substantially at right angles to the direction of movement of the film.

The plane of the film and the plane of the face of the prism adjacent the film are inclined to be vertical and horizontal to permit the forward face of the prism, that is, the one nearest the projecting lens, to occupy the proper position to transmit the light rays to the projecting lens.

The two prisms 49 and 50 are employed so that each prism may coöperate with a succeeding picture, in the same manner as described with respect to the prisms 37 and 38. The shutter which is employed is the same in both instances, the only difference between the showing in Fig. 5 and the showing in Fig. 1, is in the character of the prisms used, and the manner of movement.

With such a mechanism as herein disclosed, it is possible to use a film in which fewer pictures per unit of time are run than is at present employed.

It is the present practice to run about sixteen pictures per second, and this is necessitated because a shutter is used which at times completely obscures the light.

The present devices depend for this success upon the persistency of vision of the observer. Therefore a sufficiently high number of pictures must be moved through the machine per unit of time so that the vision will detect no break in the continuity of the light upon the screen. This is hard on films and shortens their life. With my device, inasmuch as the light is on all the time and the succeeding pictures merge or dissolve into one another, the number of pictures run per unit of time may be lessened; in fact it may be as low as possible and still produce the effect of continued action.

The particular construction of the prisms used in the machine of my invention herein described are not a part of my invention. Proper prisms may be obtained from manufacturers of such devices.

As has heretofore been stated, the film used in connection with my device is the usual film at present employed, that is to say, a single strip upon which occur, or are adapted to occur, pictures in succession. In the claims I have referred to the film having picture spaces, or adapted to have picture spaces. By this terminology I intend to cover either a film on which pictures are actually placed, or an unexposed film which is adapted to receive the pictures in spaced relationship.

Having thus described my invention, what I claim is:

1. In a device of the character described, the combination with a film having or adapted to have a single series of pictures thereon, means for moving the film continuously at uniform speed, of a lens, a plurality of light transmitting devices between the film and lens, means for moving said light transmitting means with a motion of translation, said light transmitting devices being moved in succession with the film, and transmitting the light beams between the film and the lens to maintain a constant optical relation between the film and lens.

2. In a device of the character described, the combination with a film having or adapted to have a single series of pictures thereon, means for moving the film continuously and at uniform speed, of a lens, a plurality of prisms between the lens and the film, means for moving said prisms with a motion of translation, each of said prisms being adapted to be moved in succession with the film, and transmit light beams between the film and the lens to maintain a constant optical relation between the film and the lens.

3. In a device of the character described, the combination with a film having or adapted to have a single series of pictures thereon, means for moving said film continuously at uniform speed, of a lens, a plurality of prisms between the lens and the film, means for supporting each of the said prisms, and mechanism for operating the means for supporting each prism to move each prism with a motion of translation and in succession with the film, through a predetermined distance, and for returning said prism to its initial position.

4. In a device of the character described, the combination with a film having or adapted to have a single series of pictures thereon, means for moving said film continuously at a uniform speed, of a lens, a plurality of light transmitting devices between the film and lens, means for moving said light transmitting devices with a motion of translation, said light transmitting devices being moved in succession with the film and transmitting the light beams between the film and lens, to maintain a constant optical relation between the film and lens, and a shutter provided with openings between the light transmitting devices and the lens, means for operating said shutter whereby light is permitted to pass from the light transmitting means which is moving with the film to the lens.

5. In a device of the character described, the combination with a film having or adapted to have a single series of pictures thereon, means for moving said film continuously and at uniform speed, of a lens, a plurality of light transmitting devices between the film and lens, means for moving said light transmitting devices with a motion of translation, each of said devices being adapted to be moved in succession with the film through a predetermined distance and to be returned to its initial position, and a shutter provided with openings, said shutter being adapted to permit the passage of light between light transmitting means and the lens, said light transmitting means is moved with the film and to obscure the passage of light between that light transmitting means and the lens, which light transmitting means is returning to its initial position.

6. In a device of the character described, the combination with a film having or adapted to have a single series of pictures thereon, means for moving said film continuously and at uniform speed, of a lens, a plurality of prisms between the lens and the film, means for moving said prisms with a motion of translation, each of said prisms being adapted to be moved in succession with the film a predetermined distance, and returned to its initial position, and a shutter provided with openings, means for operating said shutter whereby light is transmitted from the prism moving with the film to the lens, and obscured between the lens and that prism which is returning to its initial position.

7. In a device of the character described, the combination with a film, means for moving said film continuously at uniform speed, of a lens, a plurality of light transmitting devices between the film and lens, means for moving the light transmitting devices with a motion of translation, said light transmitting devices being moved in succession with the film and transmitting the light beams between the film and lens, and a shutter provided with staggered openings between the light transmitting device and the lens, means for operating said shutter, whereby the light is permitted to pass from that light transmitting means which is moving with the film to the lens, and to obscure the passage of light between that light transmitting means and the lens, which light transmitting means is returning to its initial position, the openings being so arranged that as an open portion is passing from before one light transmitting means, another opening is coming before the other light transmitting means, whereby the light is not entirely shut off from one light transmitting means before it is being transmitted through the other light transmitting means, thereby producing a dissolving effect between succeeding pictures.

8. In a device of the character described, the combination with a film, means for moving said film continuously and at uniform speed, of a lens, a plurality of prisms between the lens and the film, means for moving the prisms with a motion of translation, each of said prisms being adapted to be moved in succession with the film a predetermined distance, and returned to its initial position, and a shutter provided with staggered openings which pass between the prisms in alternation whereby light is transmitted from the prism moving with the lens and obscured between the lens and the prism which is returning to initial position, the openings being arranged so that when an opening leaves from before one prism another opening is coming before the other prism, whereby the light is not entirely shut off from one prism before it is being transmitted through the other prism, thereby producing a dissolving effect between succeeding pictures.

9. In a device of the character described, the combination with a film, means for moving said film continuously at uniform speed, of a lens, a light transmitting device between the film and lens to maintain a constant optical relation between the film and lens, means for bodily moving with a motion of translation the light transmitting device toward and away from the film and at a definite speed with respect to the movement of the film.

10. In a device of the character described, the combination with a film, means for moving said film continuously at uniform speed, of a lens, a light transmitting device between the film and lens, means for imparting to the light transmitting device a motion of translation in a substantially lineal path toward and away from the film and at a uniform and definite speed with respect to the film.

11. In a device of the character described, the combination with a film, means for moving said film continuously at uniform speed, of a lens, a light transmitting device between the film and lens, means for bodily moving with a motion of translation the light transmitting device toward and away from the film and in a direction which is substantially at right angles to the plane of the film.

12. In a device of the character described, the combination with a film, means for moving said film continuously at uniform speed, of a lens, a light transmitting device between the film and lens, said light transmitting device having a face adjacent the film, said face lying in a plane substantially parallel with the face of the film, means for bodily moving the light transmitting device with a motion of translation toward and away from the film while maintaining the parallel relation between the plane of the film and the plane of the face of the light transmitting device.

13. In a device of the character described, the combination with a film, means for moving said film continuously at uniform speed, of a lens, a light transmitting device between the film and lens, said light transmitting device having a face which is adjacent the film, the plane of said face of the light transmitting device being substantially parallel with the plane of the film, means for bodily moving the light transmitting device with a motion of translation toward and away from the film and preserving the parallel relationship between the plane of the film and the plane of the light transmitting device, the path of movement of said light transmitting device being in a direction substantially at right angles to the plane of the film.

14. In a device of the character described, the combination with a film, means for moving said film continuously at uniform speed, of a lens, a light transmitting device between the film and lens, said light transmitting device having a face which is adjacent the film, the plane of the face and the plane of the film being substantially parallel, the plane of both the said face and the film being at an angle with respect to the axis of the lens, and means for moving with a motion of translation the light transmitting device toward and from the film, maintaining the parallel relation between the face of the prism and the film substantially parallel during such movement.

15. In a device of the character described, the combination with a film, means for moving said film continuously at uniform speed, of a lens, a light transmitting device between the film and lens, said light transmitting device having a face which lies adjacent the film and in a plane substantially parallel with the plane of the film, said device also having a forward face which is adjacent the inner end of the lens, the plane of the film and the face of the light transmitting device adjacent thereto lying at an angle with respect to the axis of the lens, the forward face of the light transmitting device adjacent the lens occupying such a position with respect thereto as to present the light beams emanating from said light transmitting device in a direction substantially parallel with the axis of the lens, and means for moving said light transmitting means with a motion of translation toward and from the film, maintaining the faces of the prism in parallel relationship with the film and lens.

16. In a device of the character described, the combination with a film having, or adapted to have picture spaces thereon, means for moving said film continuously at uniform speed, of a lens, a plurality of light transmitting devices between the film and lens, means for moving said light transmitting devices with a motion of translation, each device in succession being moved with a movement of translation and in proper coöperation with a section of the film having a picture space thereon, each device in succession coöperating with a different section of the film as the film is moved.

17. In a device of the character described, the combination with a film having or adapted to have picture spaces, means for moving said film continuously at uniform speed, of a lens, a plurality of light transmitting devices between the film, and lens, means for moving said light transmitting devices with a motion of translation, each device in succession being moved in a manner to properly coöperate with a picture space upon the film, each device in succession coöperating with a different picture space upon the film as the film is moved.

18. In a device of the character described, the combination with a film having or adapted to have picture spaces, means for moving said film continuously, of a lens, a plurality of light transmitting devices between the film and lens, means for moving said light transmitting devices with a motion of translation and in proper coöperation, which are in succession coöperatively moved with the picture spaces of the film, each succeeding picture space upon the film coöperating with a different one of said devices.

19. In a device of the character described, the combination with a film, means for moving said film continuously at uniform speed, of a lens, a prism between the film and lens, means for bodily moving with a motion of translation the prism toward and away from the film and at a uniform and definite speed with respect to the movement of the film.

20. In a device of the character described, the combination with a film, means for moving said film continuously at uniform speed, of a lens, a prism between the film and lens, means for imparting to the prism a motion of translation in a substantially lineal path toward and away from the film and at a definite speed with respect to the movement of the film.

21. In a device of the character described, the combination with a film, means for moving said film continuously at uniform speed, of a lens, a prism between the film and lens, means for bodily moving with a motion of translation the prism toward and away from the film and in a direction which is substantially at right angles to the plane of the film.

22. In a device of the character described, the combination with a film, means for moving said film continuously at uniform speed, of a lens, a prism between the film and lens, said prism having a face adjacent the film, said face lying in a plane substantially parallel with the face of the film, means for bodily moving with a motion of translation the prism toward and away from the film while maintaining the parallel relation between the plane of the film and the plane of the face of the prism.

23. In a device of the character described, the combination with a film, means for moving said film continuously at uniform speed, of a lens, a prism between the film and lens, said prism having a face which is adjacent the film, the plane of said face of the prism being substantially parallel with the plane of the film, means for bodily moving with a motion of translation the prism toward and away from the film and preserving the parallel relationship between the plane of the film and the plane of the prism, the path of movement of said prism being in a direction substantially at right angles to the plane of the film.

24. In a device of the character described, the combination with a film, means for moving said film continuously at uniform speed, of a lens, a prism between the film and lens, said prism having a face which is adjacent the film, the plane of the face and the plane of the film being substantially parallel, the plane of both the said face and the film being at an angle with respect to the axis of the lens, and means for moving with a motion of translation the prism toward and away from the film, maintaining the parallel relationship between the film and the face of the prism.

25. In a device of the character described, the combination with a film, means for moving said film continuously at uniform speed, of a lens, a prism between the film and lens, said prism having a face which lies adjacent the film and in a plane substantially parallel with the plane of the film, said device also having a forward face which is adjacent the inner end of the lens, the plane of the film and the face of the prism adjacent thereto lying at an angle with respect to the axis of the lens, the forward face of the prism adjacent the lens occupying such a position with respect thereto as to present the light beam emanating from said prism in a direction substantially parallel with the axis of the lens, and means for moving with a motion of translation the said prism toward and away from the film while maintaining the parallel relationship between the faces of the prism, the film and the lens.

26. In a device of the character described, the combination with a film having, or adapted to have picture sections thereon arranged in alinement, means for moving said film continuously at uniform speed, of a lens, a plurality of prisms between the film and lens, means for moving each device in succession with a section of the film having a picture thereon, each device in succession coöperating with a different section of the film as the film is moved.

27. In a device of the character described, the combination with a film having or adapted to have picture spaces thereon, means for moving said film continuously at uniform speed, of a lens, a plurality of prisms between the film and lens, means for moving with a motion of translation each prism in succession coöperatively with a picture space upon the film, each prism in succession coöperating with a different picture space upon the film as the film is moved.

28. In a device of the character described, the combination with a film having or adapted to have picture spaces, means for moving said film continuously, of a lens, a plurality of prisms between the film and lens, means for moving each prism with a motion of translation in succession coöperatively with the picture spaces of the film, each succeeding picture space upon the film coöperating with a different one of said prisms.

29. In a device of the character described, the combination with a film, means for supporting and continuously moving said film, a light transmitting device, a support for the light transmitting device, means for reciprocating the said support toward and from the film with a motion of translation and a projecting lens in front of the light transmitting device.

30. In a device of the character described, the combination with a film, means for supporting and continuously moving said film, a prism, a support for the prism, means for reciprocating the said support toward and from the film with a motion of translation and a projecting lens in front of the prism.

31. In a device of the character described, the combination with a film, means for supporting and continuously moving said film, a light transmitting device in front of the film, a support for the light transmitting device, a cam for actuating the said support to move the support with a motion of translation toward and from the film, and a projecting lens in front of the prism.

32. In a device of the character described, the combination with a film, means for supporting and continuously moving said film, a plurality of light transmitting devices in front of the film, supports for the said light transmitting devices, means for reciprocating each of said supports in succession toward and from the film with a motion of translation, and a projecting lens in front of the prism.

In testimony whereof I hereunto affix my signature in the presence of two witnesses.

ARTHUR R. BULLOCK.

Witnesses:
A. J. HUDSON,
L. I. PORTER.